United States Patent [19]

Sun

[11] Patent Number: 6,133,580

[45] Date of Patent: Oct. 17, 2000

[54] COMPENSATING DEVICE FOR IMPROVING THE SCANNING LUMINANCE IN A SCANNER

[75] Inventor: Chung-Yueh Sun, Tainan Hsien, Taiwan

[73] Assignee: Mustek Systems Inc., Hsinchu, Taiwan

[21] Appl. No.: 09/168,196

[22] Filed: Oct. 7, 1998

[30] Foreign Application Priority Data

Mar. 21, 1998 [TW] Taiwan ................................. 87204149

[51] Int. Cl.$^7$ ..................................................... G06K 7/10

[52] U.S. Cl. ........................................... 250/566; 235/454

[58] Field of Search .............................. 250/566; 235/454

[56] References Cited

U.S. PATENT DOCUMENTS 4,677,287   6/1987   Riley ........................................ 250/566

Primary Examiner—Harold I. Pitts
Attorney, Agent, or Firm—Christensen O'Connor Johnson Kindness PLLC

[57] ABSTRACT

A compensating device for improving the scanning luminance of a scanner is disclosed. The compensating device utilizes a plurality of crutch-shaped light tubes to form a light-radiating device, thereby improving the scanning luminance at the two ends of the straight-line portions of the light tubes. Consequently, the object is scanned by a uniform and sufficient radiating light source and precise scanning signals are obtained and processed, thereby improving scanning quality.

11 Claims, 6 Drawing Sheets

COMPENSATING DEVICE FOR IMPROVING THE SCANNING LUMINANCE IN A SCANNER

BACKGROUND OF THE INVENTION

1. Field of the Invention

The present invention relates in general to a compensating device for improving scanning luminance. More specifically, it relates to a compensating device using crutch-shaped light tubes for improving the luminance at two ends of a scanning central line. In the present invention, at least two crutch-shaped light tubes are used to form a light-radiating device, thereby improving the light intensity and uniformity.

2. Description of the Related Art

FIG. 1 shows an image-scanning device of a first example of the prior art, which comprises a light-radiating device 14 and a focusing-and-imaging device 16. The light-radiating device 14 may be a cold-cathode tube having a straight line tube 14 and two connecting heads 144 at its ends. The focusing-and-imaging device 16 may consist of a lens set.

The light-radiating device 14 moves with respect to an object 10 which is, for example, a piece of paper or a picture, along a scanning path as indicated by arrow A. The object 10 reflects the light emitted by the light-radiating device 14, as indicated by arrows B. The focusing-and-imaging device 16 then focuses an image of the reflected light onto the image-receiving device 12 as indicated by arrow C. For instance, the image-receiving device 12 may be a charge-coupled device (CCD).

However, the object light projected onto the image-receiving device 12 is not uniform. The light corresponding to the middle portion of the object 10 is reflected more than that corresponding to both edges of the object 10, thereby causing image distortion. Increasing the length of the straight-line tube 142 cannot effectively improve the problem and merely increases the bulk of the image-scanning device.

Additionally, the image-scanning device of the first example has only one straight light tube 142, and therefore cannot generate enough light for rapid scanning.

FIG. 2 shows an image-scanning device of a second example of the prior art, in which two light-radiating devices 14 are provided to generate sufficient light for rapid scanning. However, the intensity of the light projected onto the image-receiving device 12 is still nonuniform, therefore resulting in image distortion (as mentioned in the case of using a single tube). Furthermore, the illumination at the ends of the scanning central line is not improved, and the problem of nonuniform light intensity reflected at the edges of the object 10 is not solved.

In general, the light emitted from a straight-line light tube is nonuniform. The light intensity emitted from the center of a straight-line tube is stronger than those from the two ends of the straight-line tube, and thus the luminance at the center of the scanning central line is greater than that at two ends of the scanning central line. Consequently, the image received by the charge coupled device has distortion, thereby reducing the signal accuracy and scanning quality. When using two straight-line light tubes, the contrast (difference) of luminance between the edges and the center of the scanned object increase dramatically, thereby further deteriorating the scanning quality. As a general solution, the length of the straight-line light tube is extended to overcome the above problem, and the areas of weak luminance at both ends of the straight-line light tube are not used for scanning. In this manner, only the portion of the straight-light tube with uniform luminance is used for scanning. However, the size of the scanner will necessarily increase.

SUMMARY OF THE INVENTION

Therefore, an object of the present invention is to provide a compensating device for improving the scanning luminance in a scanner. The compensating device moves with respect to a scanned object along a scanning path, enhancing both the luminance for rapid scanning and the intensity of the light projected onto the ends of the scanning central line, thereby projecting the image of the scanned object to the image-receiving device without distortion.

The compensating device according to the present invention comprises an image-receiving device and a light-radiating device. The light-radiating device projects the image of a scanned object to the image-receiving device. The present invention is characterized by a light-radiating device comprising at least two crutch-shaped light tubes, wherein each of the crutch-shaped light tubes has a straight-line portion and a U-shaped curved portion. One end of the straight-line light tube is curved into the shape of a 'U', thereby improving the luminance at the ends of the scanning central line. To get equivalent luminance, the required length of the crutch-shaped light tube (the straight-line portion) is shorter than that of a straight-line light tube; thereby, the size of a scanner can be reduced.

In order to obtain sufficient and uniform radiating light source, at least two crutch-shaped light tubes are used for forming a light-radiating device. The crutch-shaped light tubes can be disposed at the same side of a scanning central line, or at both sides of the scanning central line, respectively, to emit light to the scanned object. The straight-line portions of the crutch-shaped light tubes are disposed in parallel to the scanning central line, and the U-shaped curved portions of the crutch-shaped light tubes are disposed either at one end of the scanning central line only, or at both ends of the scanning central line, respectively. Furthermore, the straight-line portions of the crutch-shaped light tubes can serve as rotating axes, respectively, such that the planes where the crutch-shaped light tubes are disposed are rotated to specific angles with respect to the surface of the scanned object.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
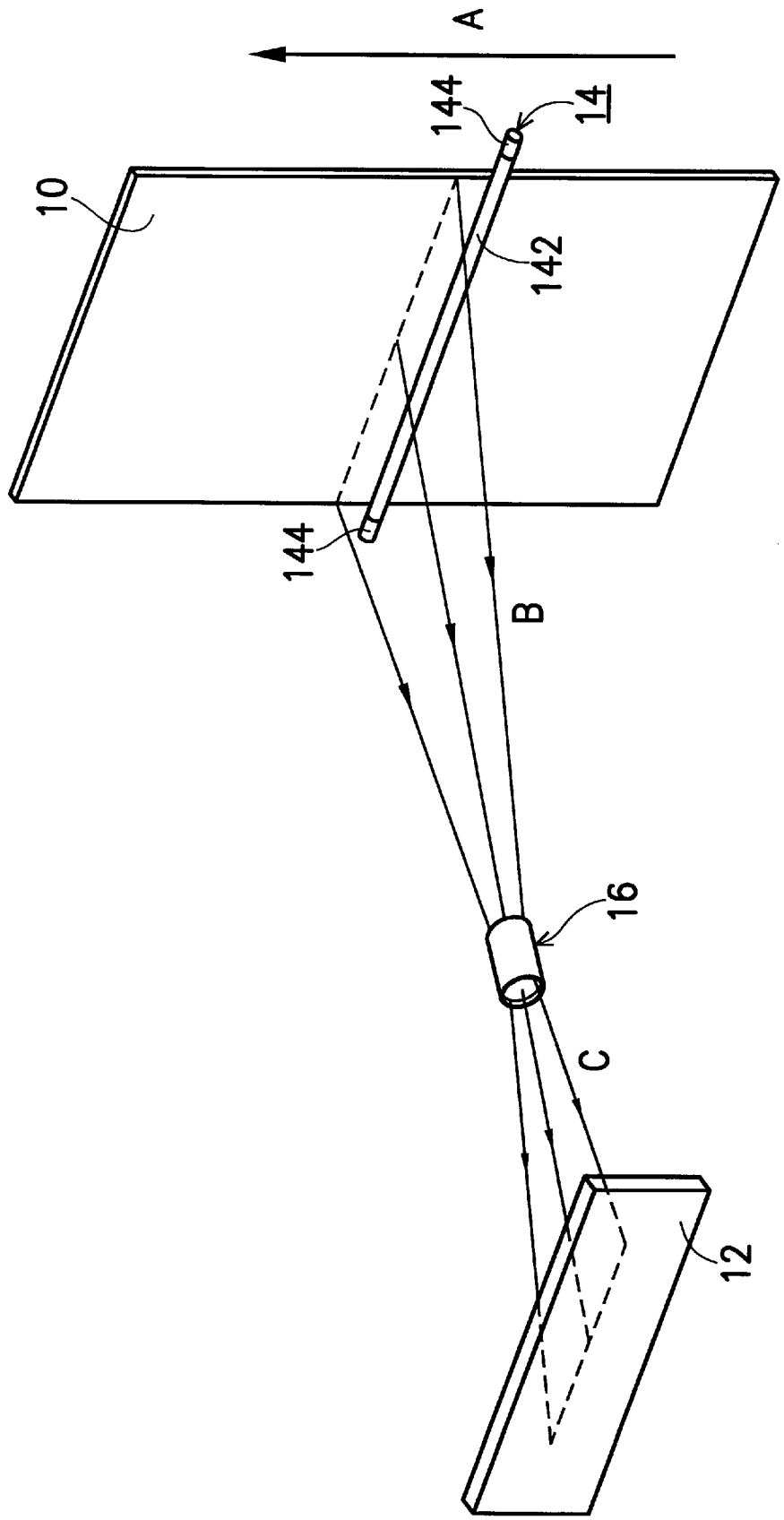
FIG. 1 shows an image-scanning device of a first example of the prior art.
Figure 2:
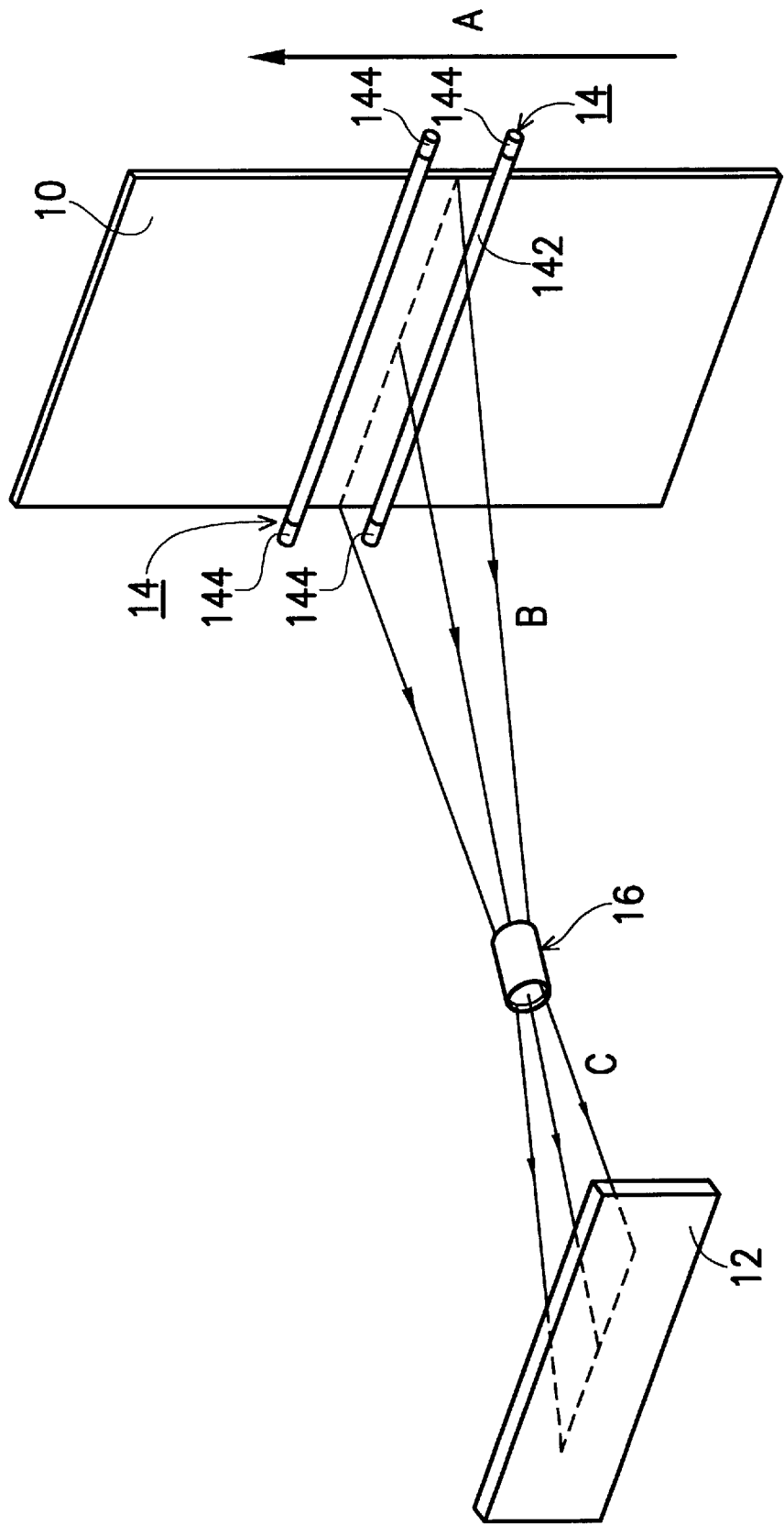
FIG. 2 shows an image-scanning device of a second example of the prior art.
Figure 3A:
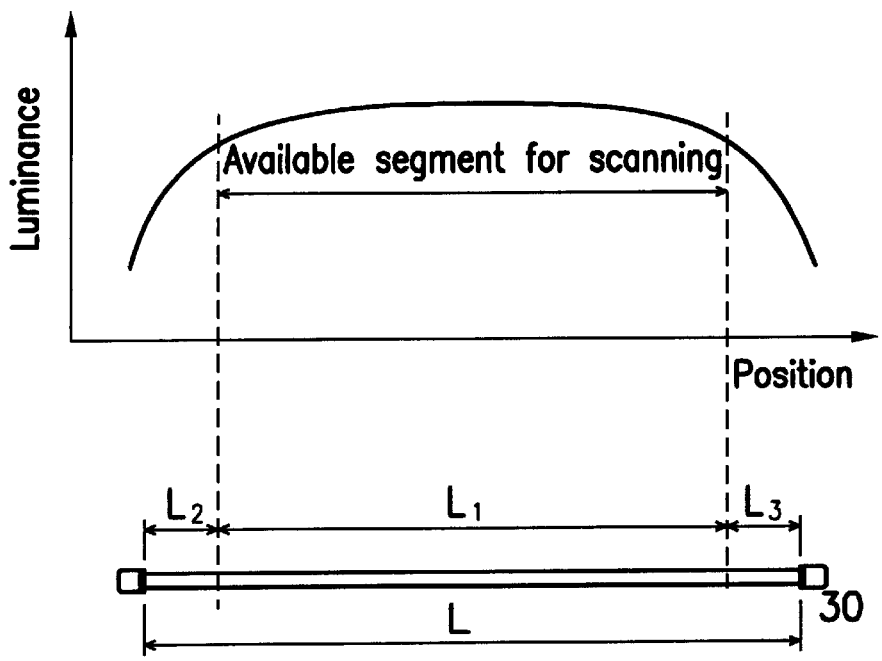
FIG. 3A shows a luminance characteristic curve of a straight-line light tube.

FIG. 3A shows a luminance characteristic curve of a conventional straight-line light tube. From FIG. 3A, the length of the straight-line light tube 30 is L, and the luminance values at both ends of the straight-line light tube 30 (segments L2 and L3) drop dramatically. Therefore, only the luminance values at the L1 segment are sufficient for scanning. According to the present invention, the crutch-shaped light tube 31 is formed by curving one end of a straight-line light tube into the shape of a 'U', thereby enhancing the luminance at one end of the light tube. The crutch-shaped light tube 31 has a straight-line portion and a U-shaped curved portion. The length of the crutch-shaped light tube 31 is shorter than that of the straight-line light tube 30 by L2, therefore the width of a scanner using the light tube can be reduced by the length L2. The luminance of the straight-line portion of the crutch-shaped light tube 31 decreases as the distance away from the center of the light tube increases, and thus the luminance at the end of the straight-line portion will be diminished. However, the U-shaped curved portion can enhance the total luminance such that the luminance at the end of the straight-line portion is compensated. The compensation for the diminished luminance at the end of the straight-line portion can be controlled by adjusting the sizes of segments L4 and L5 in FIG. 3B to optimize the luminance.

Figure 3B:
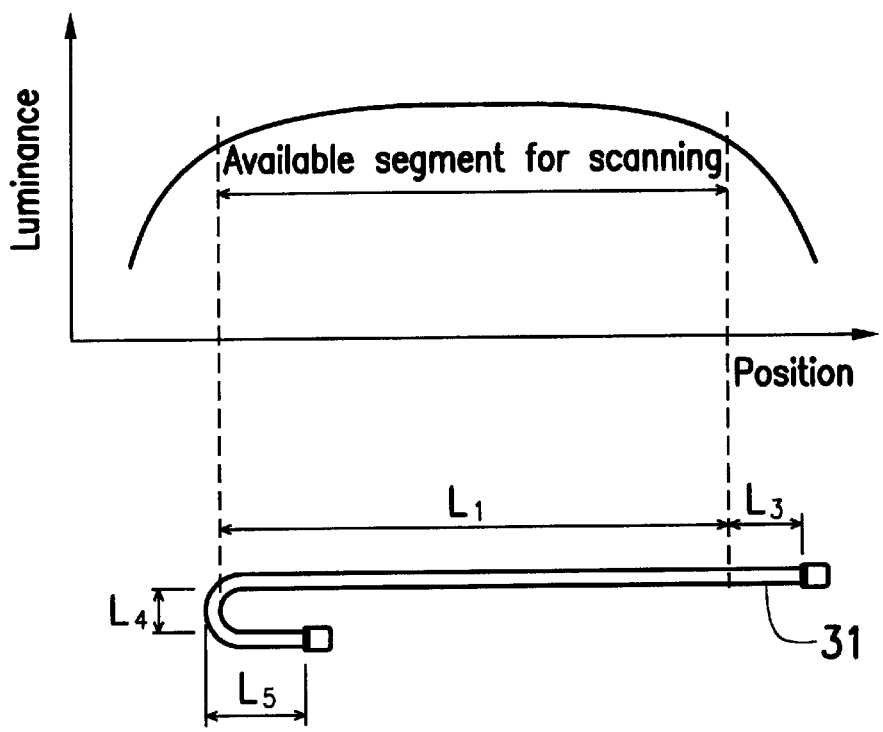
FIG. 3B shows a luminance characteristic curve of a crutch-shaped light tube.

A scanner has a light-radiating device for emitting light to a scanned object, and an image-receiving device (such as charge coupled device) for receiving the reflected image of the scanned object. The present invention is characterized by a light-radiating device comprising at least two crutch-shaped light tubes, wherein each of the crutch-shaped light tubes has a straight-line portion and a U-shaped curved portion, as depicted in FIG. 3B.

According to the present invention, a plurality of crutch-shaped light tubes are used for forming a light-radiating device, thereby compensating the luminance and improving the light intensity for rapid scanning applications. Referring to FIG. 4 to FIG. 9, the plane views of six embodiments utilizing two crutch-shaped light tubes to form light-radiating devices are depicted. In FIG. 4 to FIG. 9, numeral 40 is a scanned object (such as paper, a figure, a card, a book, etc), D is the scanning path, and SC is the scanning central line. The light-radiating device formed by crutch-shaped light tubes (42, 43) moves along the scanning path with respect to the scanned object 40, thereby projecting the image of the scanned object onto an image-receiving device (not shown in FIGS. 4~9).

Figure 4:
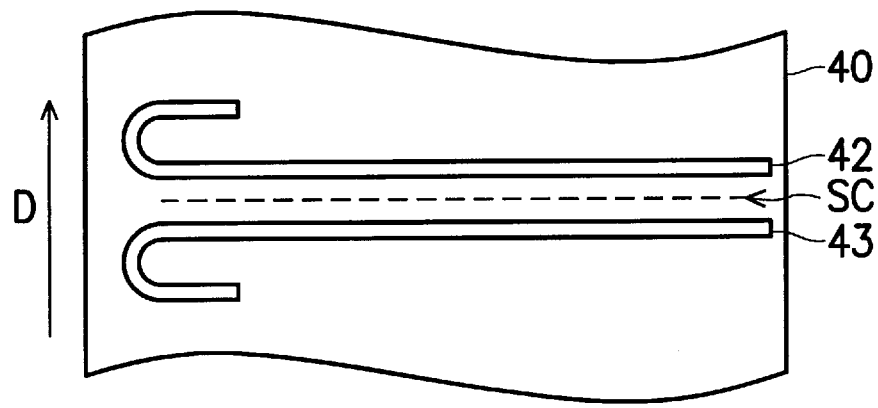
FIG. 4 shows the first embodiment according to the present invention.
Figure 5:
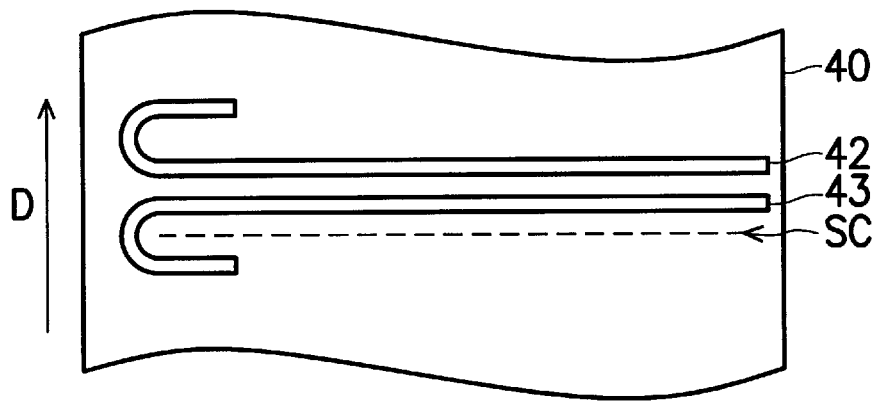
FIG. 5 shows the second embodiment according to the present invention.

FIG. 4 shows a plane view of the assembly of two crutch-shaped light tubes forming a light-radiating device. The straight-light portions of the two crutch-shaped light tubes (42, 43) are disposed in parallel with the scanning central line SC and at both sides of the scanning line SC, while the U-shaped curved portions of the crutch-shaped light tubes are disposed at the same end of the scanning central line SC. FIG. 5 is almost the same as FIG. 4, except that the straight-light portions of the two crutch-shaped light tubes (42, 43) are disposed at the same side of the scanning line SC. The crutch-shaped light tubes are used in place of the conventional straight-line light tubes, thereby compensating for the nonuniform luminance, reducing the size a scanner, and enhancing the light intensity for rapid scanning applications.

FIG. 6 to FIG. 9 show the plane views of other possible assemblies of two crutch-shaped light tubes forming a light-radiating device. In conventional art, two straight-line light tubes are used to enhance the light intensity; however, the contrast (difference) of luminance between the edges and the center of the scanned object increase dramatically, thus resulting in image distortion. In the present invention, the U-shaped curved portion of one crutch-shaped light tube is used for compensating insufficient luminance of the straight-line portion of the other crutch-shaped light tube, thereby obtaining uniform light intensity and luminance. Moreover, because the luminance of the straight-line portion can be compensated for by the U-shaped curved portion, the lengths of the straight-line portion depicted in FIGS. 6~9 can be shorter than those depicted in FIG. 4 and FIG. 5. In fact, the L3 portion (FIG. 3B) of the straight-line portion can be eliminated, thereby decreasing the size of a scanner.

Figure 6:
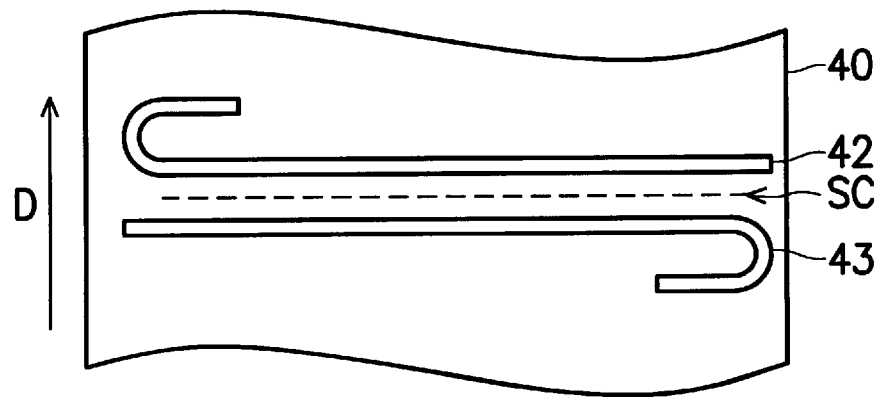
FIG. 6 shows the third embodiment according to the present invention.

In FIG. 6, the straight-line portions of two crutch-shaped light tubes (42, 43) are disposed in parallel with the scanning central line SC, and at both sides of the scanning central line SC, respectively, and the U-shaped curved portions of the two crutch-shaped light tubes (42, 43) are disposed at both ends of the scanning central line SC, respectively. Alternatively, the straight-line portions of two crutch-shaped light tubes (42, 43) can be disposed at the same side of the scanning central line SC (not shown).

Figure 7:
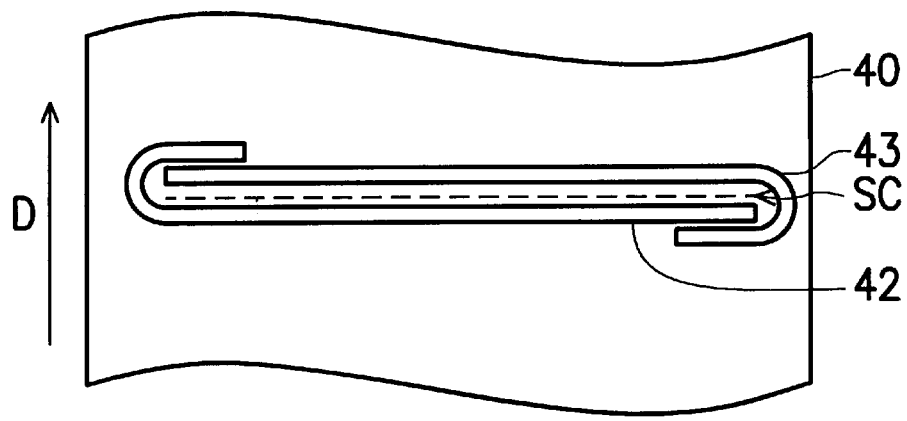
FIG. 7 shows the fourth embodiment according to the present invention.

In FIG. 7, the straight-line portion of two crutch-shaped light tubes (42, 43) are disposed in parallel with the scanning central line SC, and at both sides of the scanning central line SC, respectively, and the openings of the U-shaped curved portions are disposed around both ends of the scanning central line SC, wherein the two crutch-shaped light tubes form a loop-like area.

Figure 8:
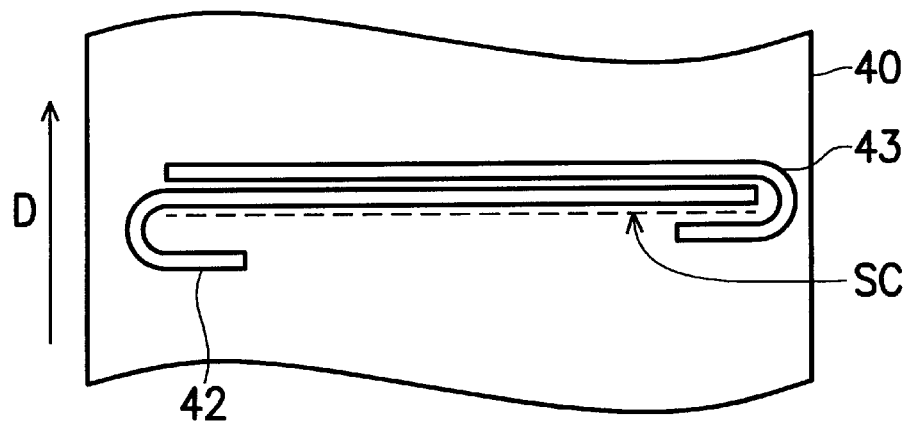
FIG. 8 shows the fifth embodiment according to the present invention.

In FIG. 8, the straight-line portion of two crutch-shaped light tubes (42, 43) are disposed in parallel with the scanning central line SC, and at the same side of the scanning central line SC, and the openings of the U-shaped curved portions are disposed around both ends of the scanning central line SC.

Figure 9:
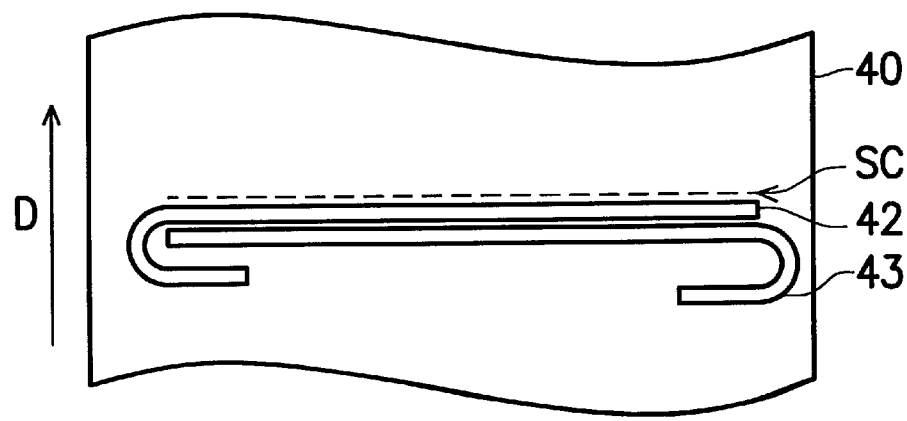
FIG. 9 shows the sixth embodiment according to the present invention.

In FIG. 9, the straight-line portion of two crutch-shaped light tubes (42, 43) are disposed in parallel with the scanning central line SC, and at the same side of the scanning central line SC, but the openings of the U-shaped curved portions are not disposed around both ends of the scanning central line SC.

The present invention utilizes the appropriate assembly of at least two crutch-shaped light tubes to improve the diminished luminance at both ends of the conventional straight-line tube, thereby obtaining a better and more uniform light source. Consequently, a more accurate and less distorted image can be received and processed by the image-receiving device, thus resulting in improved scanning quality. Furthermore, the light intensity is enhanced, allowing for rapid scanning applications.

Figure 10:
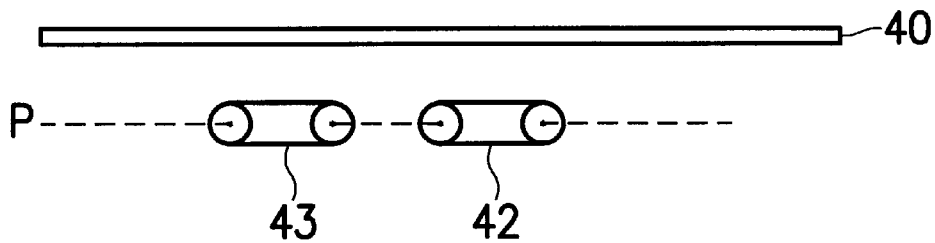
FIG. 10 to FIG. 12 show the possible dispositions of the light tubes with respect to the scanned object.
Figure 11:
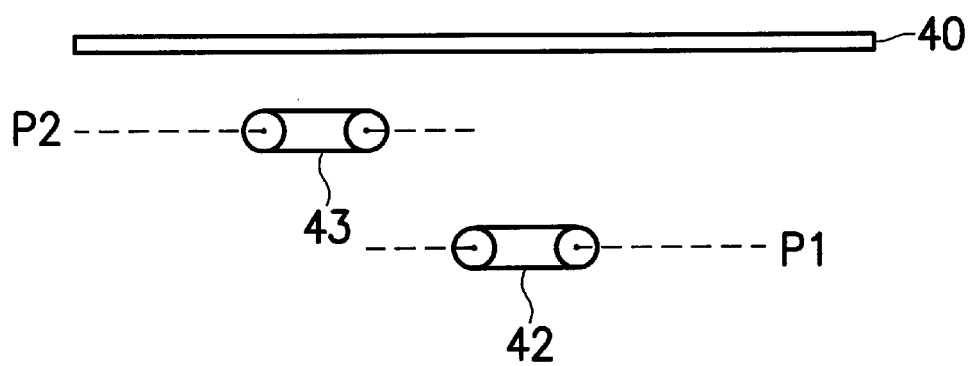
Figure 12:
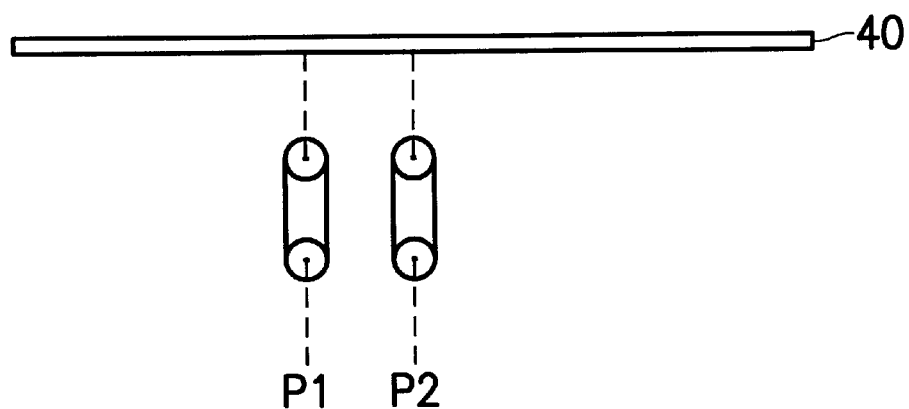

In above embodiments, two crutch-shaped light tubes (42, 43) are disposed on the same plane, and the plane is in parallel with scanned object 40. FIG. 10 is the cross-sectional view of FIG. 4 along the scanning path D, wherein two crutch-shaped light tubes (42, 43) are disposed on the same plane. However, the disposition of the two crutch-shaped light tubes (42, 43) are not limited to be on the same plane. Various spatial dispositions of the two crutch-shaped light tubes are also possible in accordance with the requirements and specifications. As shown in FIG. 11, the crutch-shaped light tubes 42 and 43 can be disposed on different planes P1 and P2. Moreover, the straight-line portions of the crutch-shaped light tubes 42 and 43 can serve as rotating axes respectively, and the planes (P1, P2) on which the two crutch-shaped light tubes 42 and 43 are disposed can be rotated to any angles with respect to the surface of the scanned object. In FIG. 12, both planes P1 and P2 are rotated to be vertical to the surface of the scanned object. Similarly, the embodiments depicted in FIG. 5 to FIG. 9 can change their spatial dispositions as described above.

While the invention has been described by way of examples and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A compensating device of a scanner for improving scanning luminance comprising at least:

a light-radiating device comprising at least two crutch-shaped light tubes, wherein each of said crutch-shaped light tubes has a straight-line portion and a U-shaped curved portion; and an image-receiving device;

wherein said light-radiating device projects light toward a scanning central line on a scanned object, and the image of said scanned object is reflected onto said image-receiving device; and the straight-line portion of each of said crutch-shaped light tubes is disposed in parallel with said scanning central line.

2. The device as claimed in claim 1, wherein the U-shaped curved portions of said crutch-shaped light tubes are disposed at the two ends of said scanning central line, respectively.

3. The device as claimed in claim 2, wherein the straight-line portions of said crutch-shaped light tubes are disposed at the two sides of said scanning central line, respectively.

4. The device as claimed in claim 2, wherein the straight-line portions of said crutch-shaped light tubes are disposed at the same side of said scanning central line.

5. The device as claimed in claim 2, wherein at least two said crutch-shaped light tubes are disposed with the openings of their U-shaped curved portions around the two ends of said scanning central line, respectively.

6. The device as claimed in claim 1, wherein the U-shaped curved portions of said crutch-shaped light tubes are disposed at the same end of said scanning central line.

7. The device as claimed in claim 6, wherein the straight-line portions of said crutch-shaped light tubes are disposed at two sides of said scanning central, line respectively.

8. The device as claimed in claim 6, wherein the straight-line portions of said crutch-shaped light tubes are disposed at the same side of said scanning central line.

9. The device as claimed in claim 1, wherein said crutch-shaped light tubes are disposed on a single plane and said plane is parallel to the surface of said scanned object.

10. The device as claimed in claim 1, wherein said crutch-shaped light tubes are disposed on different planes and said planes are parallel to the surface of said scanned object.

11. The device as claimed in claim 1, wherein the straight-line portions of said crutch-shaped light tubes serve as rotating axes, respectively, such that the planes where said crutch-shaped light tubes are disposed are rotated to specific angles with respect to the surface of said scanned object.

* * * * *